Sept. 8, 1931.  L. F. MUTHER  1,822,500

SUPPORT FOR MEASURING INSTRUMENTS

Filed March 24, 1930

Inventor
Lorenz F. Muther
by Harry Dexter Peck
Attorney

Patented Sept. 8, 1931

1,822,500

UNITED STATES PATENT OFFICE

LORENZ F. MUTHER, OF NEWTON CENTER, MASSACHUSETTS

SUPPORT FOR MEASURING INSTRUMENTS

Application filed March 24, 1930. Serial No. 438,376.

This invention relates to improvements in a support for a measuring instrument. It is particularly directed to a support for an instrument such as is disclosed in United States Letters Patent #1,630,833 granted May 31, 1927 to Charles F. Cowdrey, and #1,712,055 granted May 7, 1929 to Edward R. Smith. This instrument is designed to be carried by a moving body and to indicate the acceleration or deceleration thereof. It is especially useful in testing the brake efficiency of automobiles and when so used the indicating unit is graduated in terms which express the number of feet the vehicle would travel before coming to rest, if the brakes are applied when the car is moving at a predetermined velocity.

The principle upon which the measuring instrument operates is that of inertia, there being weighted levers which move according to the force of inertia and interconnected mechanism which actuates an indicating dial, whose readings correspond to the movement of the levers. The latter are designed to be rotated on vertical axes and so in setting the instrument at the beginning of a test, it is essential that it be supported horizontally, with the axles of the levers vertical, otherwise the levers would not be able to assume the so-called zero or starting positions nor would their movement be in accordance with the force of inertia. It is not difficult to find a level piece of roadway upon which to stop the car and set the instrument. But this is not enough for usually the floor of the vehicle is itself not parallel to the ground. Many passenger cars and almost all trucks are so constructed that when empty their bodies have a decided forward pitch, the idea being that as the load is added the rear end of the vehicle will be depressed and so bring the whole body into a more or less horizontal position while in service. The degree of tilt is therefore a variable dependent upon the load carried, and since the instruments referred to are used by many representatives of the law, who stop vehicles, especially trucks, on the highways and proceed to check their brake efficiency, it is quite desirable to have some convenient and reliable means of supporting the instrument on the vehicle so that the variable tilt of its body can be readily compensated and a proper setting of the instrument easily and quickly made. It is to this end that the present invention is directed.

The principal object of the invention is to provide a light, durable support, which can be conveniently carried by hand and to which the measuring instrument can be secured. It is also among the objects of the invention to so construct the support that its own base will adapt itself to uneven surfaces and remain steady and to provide means mounted on this base, and actually carrying the instrument, which are capable of quick and accurate adjustment to bring the instrument into parallelism with the ground, assuming of course, that the latter is horizontal.

These objects and the features which characterize the invention are attained by providing a support comprising a base plate having three legs adapted to rest on the floor of a vehicle, and a sturdy offset handle which can be consequently gripped by the tester. Pivotally mounted on this base is a plate to which the measuring instrument can be rigidly clamped. This plate is normally urged to swing away from the base but a locking clamp is provided which, when the plate has been swung to that position in which the instrument is horizontal, can be tightened and thus lock the plate in said position.

It is intended that the patent shall cover by suitable expression in the appended claims, whatever features of patentable novelty exist in the invention disclosed.

Figure 1:
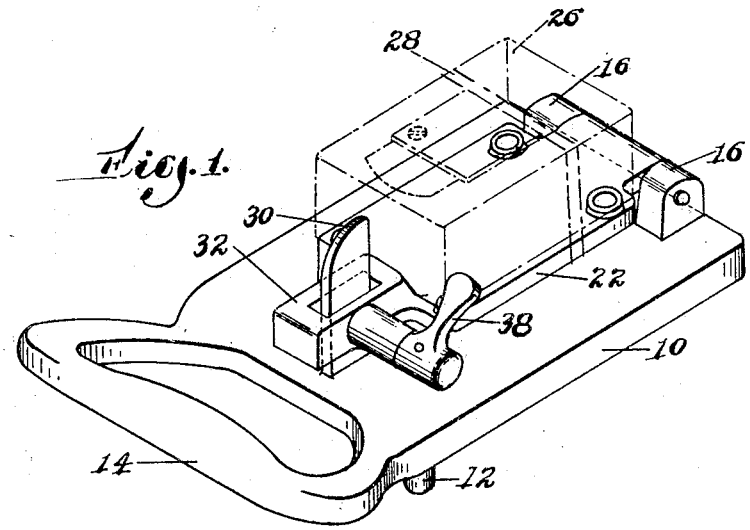
Figure 1 is a perspective of a support embodying the present invention, with a measuring instrument represented by dot and dash outline.
Figure 2:
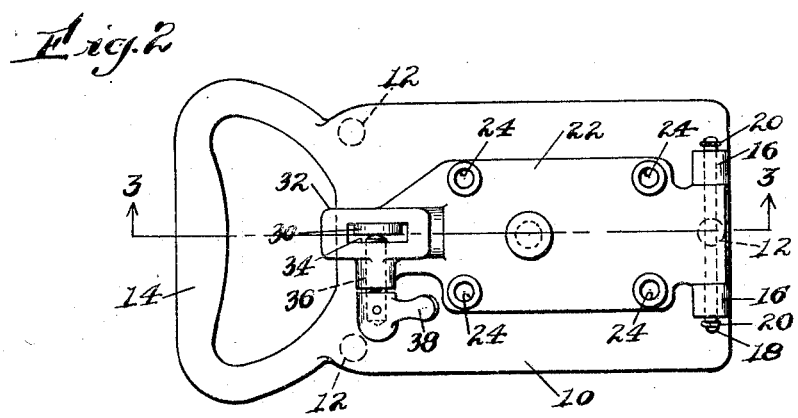
Figure 2 is a plan of the support.

Referring to the drawings, the novel support comprises a base 10 having three legs 12 triangularly arranged so that when placed upon the uneven or worn floor of an automobile, the support will be held steady. Extending rearward and somewhat upward from the base is a handle 14 of ample size to permit the fingers to be easily passed through the hole bordered by the handle and edge of the base. At the forward edge of the base are two upstanding lugs 16 constituting bearings for a pin shaft 18 which projects through them and has outside of the lugs, at each end, a groove which receives a split ring 20 that prevents dislodgement of the pin.

On this shaft or axle 18 is pivotally mounted a plate 22 having four holes 24 therethrough with bossed edges. Upon these rest the bottom of the measuring instrument 26 represented in Figure 1 by the dot and dash outline. The upper and lower sections of the instrument casing are held together by four bolts, the nuts of which can fit within the holes 24 of the plate 22. A strap 28 is passed around the instrument and the plate and secures them tightly together.

Figure 3:
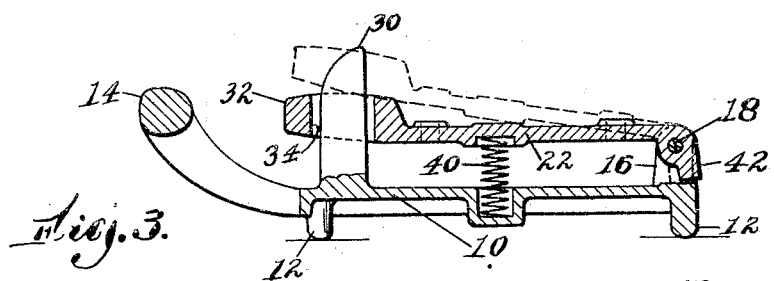
Figure 3 is an elevation in section thereof, as on line 3—3 of Figure 2.

Near the rear edge of the base is a post 30, and at the rear of plate 22 is an arm 32 having a hole 34 therein through which the post 30 projects. A clamping screw 36 carried by the arm can be turned therein by the handle 38 to clamp the arm and post together. Between the base 10 and plate 22 is a coiled spring 40 which tends to swing the two apart, but the maximum amount of this swing is indicated by the dotted outline in Figure 3, this limit being established by the engagement of a depending lug 42 at the forward edge of the plate with the base 10.

When the support is placed upon the floor of a vehicle, the screw 36 is loosened and the plate 22 moved upward or downward until the dial of the measuring instrument reads zero, thus indicating that it is horizontal. The handle 38 is then turned to lock the plate and instrument in this horizontal position. The test of the vehicle can then be made, and after the final reading of the instrument has been taken, the latter and its support can be easily lifted by gripping the handle 14 and carried to the next vehicle to be tested.

I claim:

1. A support for an instrument adapted to be initially set horizontal comprising a base; a plate pivotally mounted at one end on the base and adapted to receive the instrument; means tending to swing the plate about its pivot away from the base; and means near the end of the plate opposite its pivotal mounting whereby the plate can be locked to its base at that angle of swing whereat the instrument is set horizontal.

2. A support for an instrument adapted to be initially set horizontal comprising a base; having a three-point bearing; a plate, pivotally connected near one end to said base, and having means at its opposite end adapted to lock it to the base in such relation therewith as to position the instrument horizontal, and having means intermediate its ends and between said base and plate urging the latter to swing away from the former.

3. A support for an instrument adapted to be initially set horizontal comprising a base having a three-point bearing; a plate mounted at one end on a horizontal axle carried by said base and adapted to receive the instrument; said plate having a hole at its opposite end and a clamping screw adapted to enter said hole; a post on the base arranged to enter said hole and be engaged by said screw whereby the plate can be locked with respect to the base to position said instrument horizontal.

4. A support for an instrument adapted to be initially set horizontal comprising a base having a looped portion at one end constituting a handle for carrying the support; a plate pivotally mounted at one end on a horizontal axis at the end of said base remote from said handle and adapted to receive the instrument, the plate being movable angularly with respect to the base about said horizontal axis; means urging the plate to swing about the said horizontal axis away from the base, and means for locking the plate with respect to the base at that angular position whereat the instrument is set horizontal.

5. A support for an instrument adapted to be initially set horizontal comprising a base with an upstanding post near one end thereof; a plate adapted to receive the instrument pivotally mounted at the opposite end of said base and having a hole through which the post extends; a spring interposed between said base and plate tending to swing them apart; a lug on said plate adapted to engage the base and limit the extent to which said spring can force said plate and base apart; and means carried by said plate and adapted to engage said post whereby the plate can be held in such relation to the base as to position the instrument horizontal.

Signed at Boston, Massachusetts, this thirteenth day of March 1930.

LORENZ F. MUTHER.